US012626097B2

(12) United States Patent
Lohia et al.

(10) Patent No.: US 12,626,097 B2
(45) Date of Patent: May 12, 2026

(54) ENSEMBLE TIME SERIES MODEL FOR FORECASTING

(71) Applicant: Humana Inc., Louisville, KY (US)

(72) Inventors: Nibhrat Lohia, Boston, MA (US);
Peyman Yousefian, Frederick, MD
(US); Sayantan Mitra, San Bernardino,
CA (US); Rajiv Gumpina, Louisville,
KY (US)

(73) Assignee: Humana Inc., Louisville, KY (US)

( * ) Notice: Subject to any disclaimer, the term of this
patent is extended or adjusted under 35
U.S.C. 154(b) by 964 days.

(21) Appl. No.: 17/731,183

(22) Filed: Apr. 27, 2022

(65) Prior Publication Data

US 2023/0351155 A1     Nov. 2, 2023

(51) Int. Cl.
*G06N 3/045*          (2023.01)
*G06N 3/044*          (2023.01)
*G06N 3/084*          (2023.01)

(52) U.S. Cl.
CPC ............. *G06N 3/045* (2023.01); *G06N 3/044*
(2023.01); *G06N 3/084* (2013.01)

(58) Field of Classification Search
CPC ........ G06N 3/045; G06N 3/044; G06N 3/084;
G06N 3/0442
See application file for complete search history.

(56) References Cited

U.S. PATENT DOCUMENTS

| | | | | |
|---|---|---|---|---|
| 2012/0215554 A1* | 8/2012 | Yurkovich | ............. | G06Q 10/10 |
| | | | | 705/2 |
| 2021/0358638 A1* | 11/2021 | Sreenivasan | ........... | G16H 10/60 |
| 2021/0369163 A1* | 12/2021 | Hu | ........................ | A61B 5/7264 |
| 2022/0230728 A1* | 7/2022 | Vos | ........................ | G16H 50/30 |
| 2023/0237386 A1* | 7/2023 | Raut | ................... | G06F 18/2148 |
| | | | | 706/12 |

* cited by examiner

*Primary Examiner* — Cesar B Paula
*Assistant Examiner* — David Tan
(74) *Attorney, Agent, or Firm* — Standley Law Group
LLP; Jeffrey S. Standley; James L. Kwak

(57)          ABSTRACT
An ensemble time series prediction system that makes
predictions based on observed data. The disclosed ensemble
time series prediction system may leverage different types of
datasets and information from different resources for making
predictions. The disclosed ensemble time series prediction
system may extract time dependent features from autore-
gressive time dependent data, embedding features from
sparse datasets, continuous features from continuous data-
set, and time lagged features from data that include time-lag
information. The disclosed ensemble time series prediction
system may then consolidate the features extracted from the
different types of datasets and generate a set of consolidated
input features for training a neural network, which may
include a recurrent neural unit that finds sequential pattern
for the sequence of input features and a regression unit that
performs regression and predictions. The ensemble time
series prediction system may output a set of outputs that
include predicted values and associated confidence intervals.

14 Claims, 4 Drawing Sheets

100

400

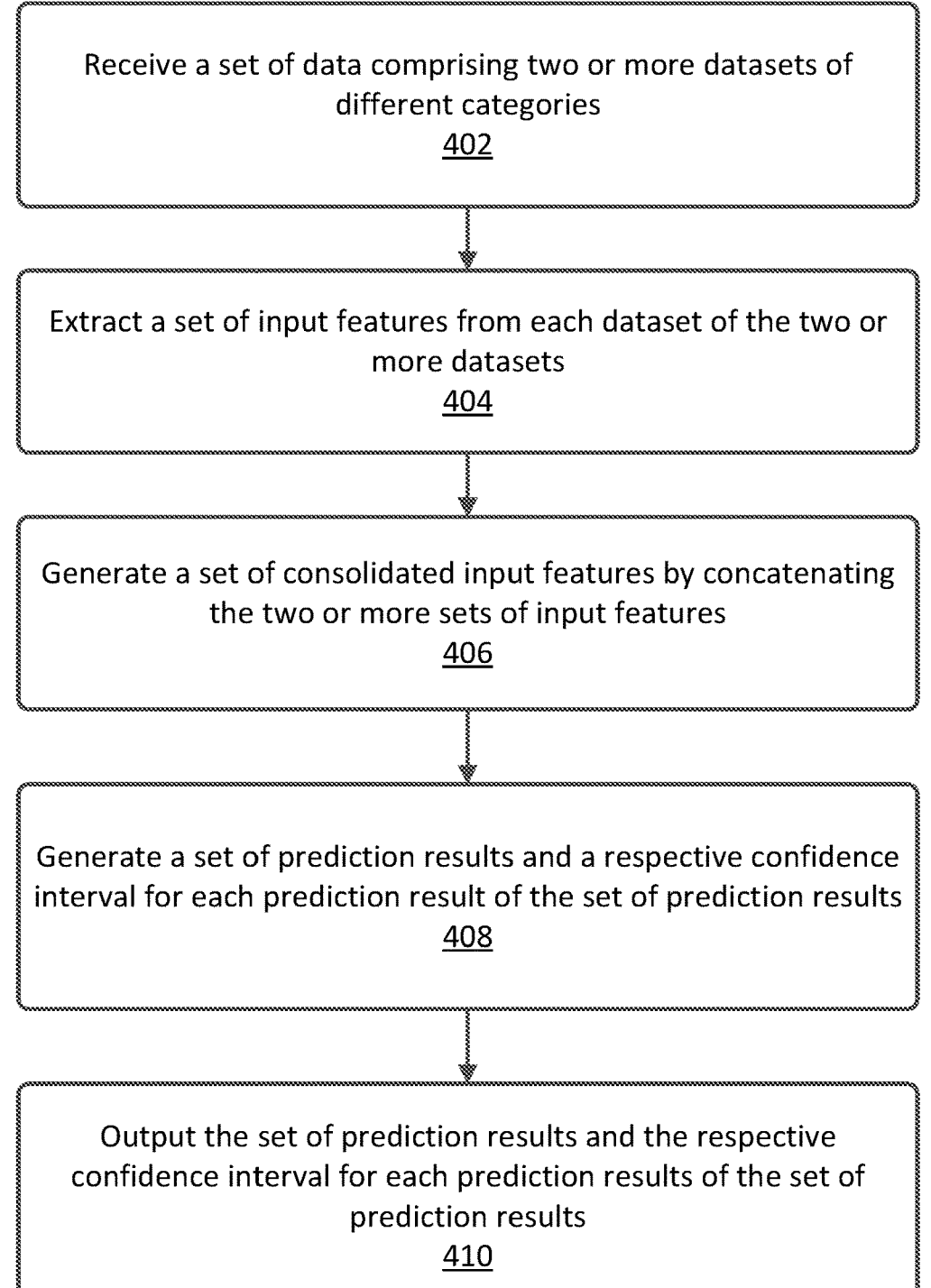

Receive a set of data comprising two or more datasets of different categories
402

Extract a set of input features from each dataset of the two or more datasets
404

Generate a set of consolidated input features by concatenating the two or more sets of input features
406

Generate a set of prediction results and a respective confidence interval for each prediction result of the set of prediction results
408

Output the set of prediction results and the respective confidence interval for each prediction results of the set of prediction results
410

FIG. 4

ENSEMBLE TIME SERIES MODEL FOR FORECASTING

FIELD OF INVENTION

This invention relates generally to making predictions using machine learning models, and more particularly to making predictions using an ensemble time series prediction model.

BACKGROUND

Several applications generate time series data, for example, sensors, online systems, processes executing on computing systems, and so on. These applications often make predictions based on the time series data. A machine learning based predictive model is a commonly used technique for predicting outcomes based on such data. The predictive model may use historical values associated with an entity and predict a possibility of an event for the entity (e.g., predicting a probability that a person is associated with a particular event). Predictive models require a certain amount of training data for training parameters associated with the models. However, in some scenarios, the quantity of available training data is limited, which leads to suboptimal performance of the predictions.

SUMMARY

Systems and methods are disclosed herein for an ensemble time series prediction system for making predictions based on observed data. The disclosed ensemble time series prediction system may leverage different types of datasets and information from different resources for making predictions. The disclosed ensemble time series prediction system may extract time dependent features from autoregressive time dependent data, embedding features from sparse datasets, continuous features from continuous dataset, and time lagged features from data that include time-lag information. The disclosed ensemble time series prediction system may then consolidate the features extracted from the different types of datasets and generate a set of consolidated input features for training a neural network, which may include a recurrent neural unit that finds sequential pattern for the sequence of input features and a regression unit that performs regression and predictions. The ensemble time series prediction system may output a set of outputs that include predicted values and associated confidence intervals. The ensemble time series prediction system may leverage multiple categories of data and construct an ensemble model with sub-models processing the multiple categories of data. For example, the ensemble time series prediction system may include four sub-models for processing and extracting time dependent features, embedding features, continuous features, and time-lagged features. The sub-models may perform different functionalities such as feature embeddings, feature extraction, etc. The sub-models may also include additional neural networks for processing datasets with specific characteristics. For example, the sub-model may further include a neural network such as an LSTM (Long short-term memory) for processing sequential data. The sub-models may output feature vectors for each input dataset and then a concatenation module may concatenate the outputs from the sub-models and generate a consolidated feature vector that include features from all input datasets. The consolidated feature vectors are used as input for a recurrent neural network of the ensemble time series prediction system. The recurrent neural network may perform forward pass and backpropagation and generate regression predictions. In one embodiment, the predictions may be associated with confidence intervals, that indicate a range and a likelihood that the predicted values fall within the range. The disclosed ensemble time series prediction system improves prediction performance when limited amount of data is available.

BRIEF DESCRIPTION OF THE DRAWINGS

FIG. 4 illustrates an exemplary prediction process using an ensemble time series prediction system, according to one embodiment.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

System Overview

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is disclosed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Figure 1:
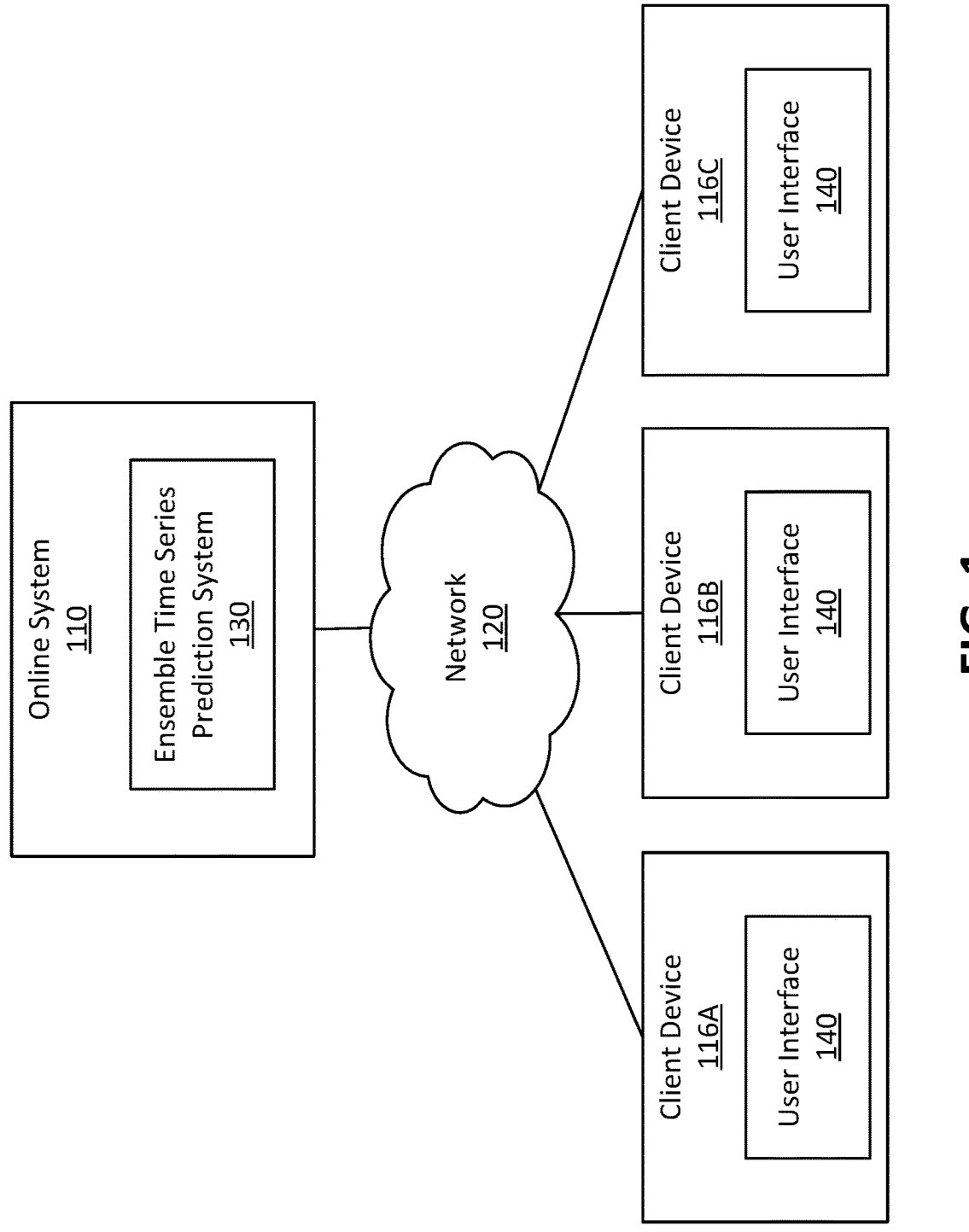
FIG. 1 is an exemplary system environment including an ensemble time series prediction system, according to one embodiment.

FIG. 1 is a high-level block diagram of a system environment for an ensemble time series prediction system 130, in accordance with an embodiment. The system environment 100 shown by FIG. 1 includes one or more clients 116, a network 120, and the ensemble time series prediction system 130. In alternative configurations, different and/or additional components may be included in the system environment 100.

The network 120 represents the communication pathways between the client 116 and ensemble time series prediction system 130. In one embodiment, the network 120 is the Internet. The network 120 can also utilize dedicated or private communications links that are not necessarily part of the Internet. In one embodiment, the network 120 uses standard communications technologies and/or protocols. Thus, the network 120 can include links using technologies such as Ethernet, Wi-Fi (802.11), integrated services digital network (ISDN), digital subscriber line (DSL), asynchronous transfer mode (ATM), etc. Similarly, the networking protocols used on the network 120 can include multiprotocol label switching (MPLS), the transmission control protocol/ Internet protocol (TCP/IP), the hypertext transport protocol (HTTP), the simple mail transfer protocol (SMTP), the file transfer protocol (FTP), etc. In one embodiment, at least some of the links use mobile networking technologies, including general packet radio service (GPRS), enhanced data GSM environment (EDGE), long term evolution (LTE), code division multiple access 2000 (CDMA2000), and/or wide-band CDMA (WCDMA). The data exchanged over the network 120 can be represented using technologies and/or formats including the hypertext markup language (HTML), the extensible markup language (XML), the wireless access protocol (WAP), the short message service (SMS) etc. In addition, all or some of the links can be encrypted using conventional encryption technologies such as the secure sockets layer (SSL), Secure HTTP and/or virtual private networks (VPNs). In another embodiment, the entities can use custom and/or dedicated data communications technologies instead of, or in addition to, the ones described above.

The client 116 may include one or more computing devices that display information to users, communicate user actions, transmit, and receive data from the ensemble time series prediction system 130 through the network 120. While only three clients 116A-C are illustrated in FIG. 1, in practice many clients 116 may communicate with the ensemble time series prediction system 130 in the environment 100. In one embodiment, client 116 may be operated in connection with a service provided by the ensemble time series prediction system 130 for prediction tasks. For example, client 116 may be operated by a representative of an organization or an entity that provides service to customers, or any other entity interested in generating meaningful insights through big datasets.

The client 116 may receive services by using software tools or through web pages provided by the ensemble time series prediction system 130 for risk analysis. The tools may be software applications or browser applications that enable interactions between the client 116 and the ensemble time series prediction system 130 via the network 120. The client 116 may access the software tool through a browser or may download the software tool through a third-party application platform, such as an app store. In one embodiment, the client 116 interacts with the network 120 through an application programming interface (API). In one embodiment, the tools may receive inputs from the client 116 which are further used to develop training dataset or to retrain the model. The software tools may include an interface through which the client 116 may provide information or feedback with regard to the prediction results.

The client 116 may include one or more computing devices that are capable of deploying a machine learning model. The client 116 may receive trained machine learning models from the ensemble time series prediction system 130 and perform real-world deployments of the trained machine learning model on a dataset collected based on communications. The deployments of the model may be conducted on one or more devices of the client 116. The model may also be deployed remotely by the ensemble time series prediction system 130 (or a third-party cloud service that is capable of deploying the model), in which case, collected data may be transmitted from client 116 to the ensemble time series prediction system 130 (or the cloud service provider). The ensemble time series prediction system 130 may analyze the collected data and provide outputs back to client 116 (e.g., through a network communication, such as communication over the Internet). Where the model is deployed local to the client, a software package developed and distributed by ensemble time series prediction system 130 may be downloaded to or otherwise transferred to client 116 and may be executed to perform any described post-output analysis.

The client 116 may also include one or more computing devices that are capable of displaying a user interface 140 through the computing devices. The client 116 may access service provided by the ensemble time series prediction system 130. The user interface 140 may enable users to view risk profile and/or risk prediction results. The user interface 140 may also display other information such as user profile, user information, historical data such as medical history, etc.

The ensemble time series prediction system 130 may manage and provide an end-to-end service for training a machine learning model and making predictions. The ensemble time series prediction system 130 may train a machine learning model pipeline that leverages information from multiple sources for forecasting. In one embodiment, the ensemble time series prediction system 130 uses historical values, time dependent features, dataset with high dimensionality, continuous features, and time lagged features. In one embodiment, the ensemble time series prediction system 130 uses any number of the above-mentioned datasets, while in some embodiments, the ensemble time series prediction system 130 may use all of the datasets. In some embodiments, the ensemble time series prediction system 130 leverages even more types of information that help with improving the model performance. The ensemble time series prediction system 130 may process each dataset from different sources in parallel, and then extract a set of feature vectors for each category of data. The ensemble time series prediction system 130 may then concatenate the different datasets into a consolidated input dataset. The ensemble time series prediction system 130 may then input the consolidated input dataset into a recurrent network and a regression model. The ensemble time series prediction system 130 may output predictions with respective confidence intervals. Further details with regard to functionalities provided by the ensemble time series prediction system 130 are illustrated in FIG. 2.

The ensemble time series prediction system provides multiple advantageous technical features for making forecasts. For example, the ensemble time series prediction system may improve prediction performance by leveraging information from multiple resources and data from different categories. As a particular example, generic dispense rate (GDR) may refer to the percentage of generic drugs of all prescription drugs. Forecasting GDR may help understanding and predicting measure of generic drug use. In some embodiments, to forecast GDR, a model may use historical GDRs for predictions. The ensemble time series prediction system may leverage multiple categories of data and construct an ensemble model with sub-models processing the multiple categories of data. For example, to predict GDR, the ensemble time series prediction system may include four sub-models for processing and extracting time dependent features (e.g., blood sugar levels), embedding features (e.g., demographic information), continuous features (e.g., ages), and time-lagged features (e.g., medical claims data). The sub-models may perform different functionalities such as feature embeddings, feature extraction, etc. The sub-models may also include additional neural networks for processing datasets with specific characteristics. For example, the sub-model may further include a neural network such as an LSTM (Long short-term memory) for processing sequential data. The sub-models may output feature vectors for each input dataset and then a concatenation module may concatenate the outputs from the sub-models and generate a consolidated feature vector that include features from all input datasets. The consolidated feature vectors are used as input for a recurrent neural network of the ensemble time series prediction system. The recurrent neural network may perform forward pass and backpropagation and generate regression predictions. In one embodiment, the predictions may be associated with confidence intervals, that indicate a range and a likelihood that the predicted values may fall within the range. The disclosed ensemble time series prediction system may improve prediction performance when limited amount of data is available.

The disclosed ensemble time series prediction system may be applied in various scenarios for making predictions that are potentially influenced by multiple categories of data. For illustration purposes, the specific example used throughout the description may be related to forecasting generic dispense rate or adherence rate. This specific example is for illustration purposes only, whereas the ensemble time series prediction system may be used to perform any forecasting tasks. For example, the ensemble time series prediction system may also predict website traffic (e.g., number of visits or interactions) based on various categories of input features including historical visits, demographic data of users, time lagged data due to internet connection, etc. As another example, the ensemble time series prediction system may forecast supply or demand, as well as prices, which may leverage different inter-related input data such as prior values, customer demographic data, time-lagged billing data, etc.

Figure 2:
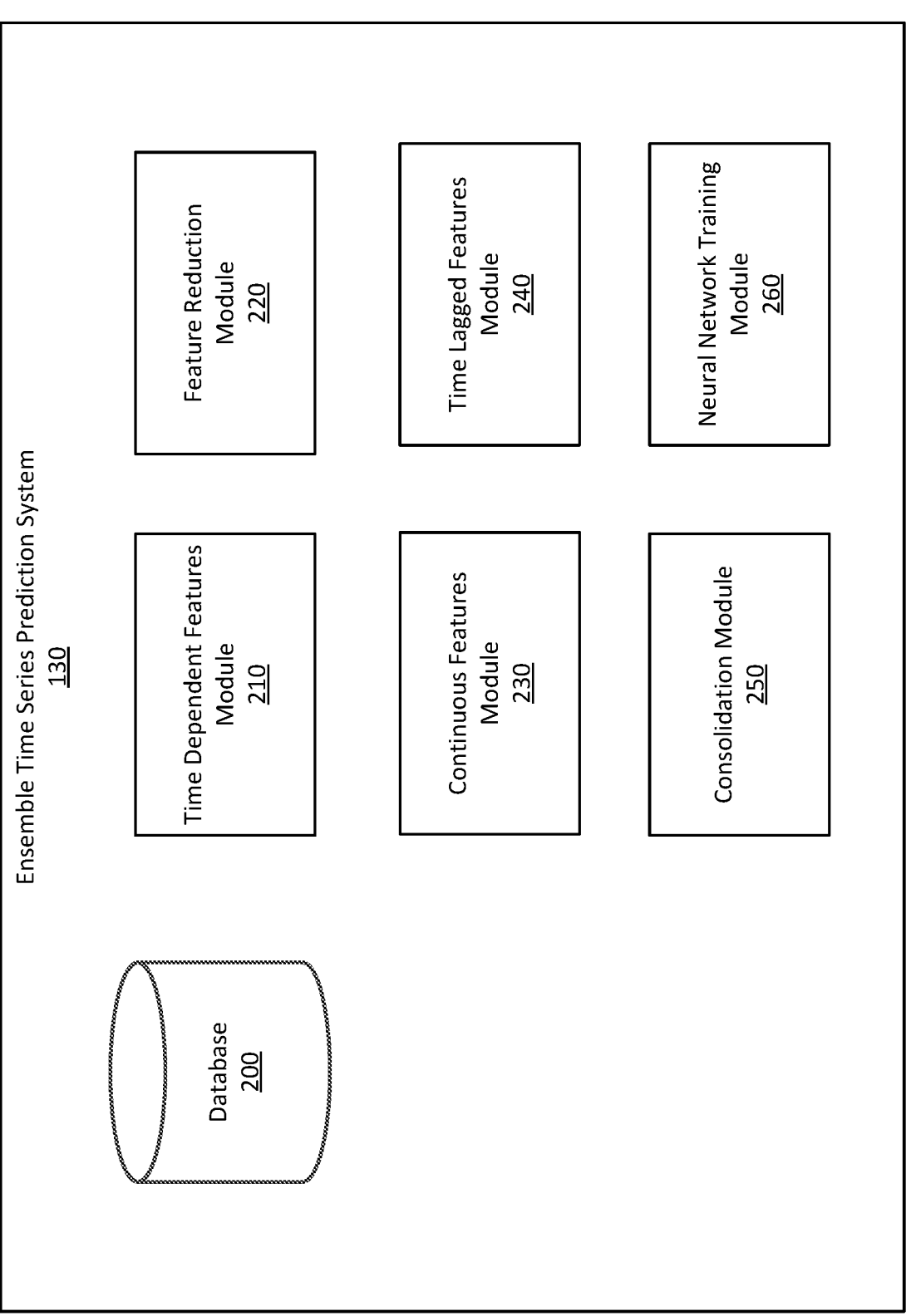
FIG. 2 illustrates an exemplary embodiment of modules in an ensemble time series prediction system, according to one embodiment.

FIG. 2 illustrates an exemplary embodiment of modules in the ensemble time series prediction system 130, according to one embodiment. The ensemble time series prediction system 130 may include a database 200 for storing data, a time dependent features module 210 that extracts time dependent features, a feature reduction module 220 that reduces dimensionality for sparse dataset, a continuous feature module 230 that processes continuous dataset, a time lagged features module 240 that processes time lagged datasets, a consolidation module 250 that generates consolidated input feature vectors for subsequent neural networks, and a neural network training module 260 that trains a recurrent neural network for regression. Detailed functionalities for each module are discussed below.

The database 200 may store information received from client devices 116 and extracted feature vectors or any intermediate results for generating predictions. The database 200 may also store trained parameters associated with the time series prediction model. In one embodiment, the database 200 may store raw data of different types. For example, the database 200 may store time-dependent data, large sets of sparse data with high dimensionality, continuous data such as numerical data, and time lagged data. The raw datasets are further passed to modules 210-250 for further processing. In one embodiment, the database 200 also stores historical data for the value of interest for forecasting. For example, the database 200 may store historical generic dispense rates if the ensemble time series predictive model is trained to forecast generic dispense rates.

The time dependent features module 210 may extract time dependent features from autoregressive time dependent datasets. Autoregressive time dependent datasets, as referred herein, may refer to a combination of past values of a variable, wherein a value at a later time is determined at least partially based on one of the prior values. For example, a dataset including blood sugar levels may be an autoregressive dataset, wherein a blood sugar level at t1 is determined based on a blood sugar level at t0 (e.g., starting blood sugar level), because the blood sugar level at t1 may be inferred based on the blood sugar level at t0 while taking into account of other factors such as food consumption, exercises, and demographic data. Another example of autoregressive time dependent data is BMI (Body Mass Index) because a future BMI is dependent at least on one of the prior BMIs. For example, a later BMI may be calculated based on a prior BMI, taking into consideration of other factors (e.g., calorie intake, measurements, exercises, etc.) In one embodiment, the time dependent features module 210 may create input dataset for passing to the consolidation module 250. The time dependent features module 210 may create a set of feature vectors including observed values of the autoregressive time dependent variable and a timestamp for each value (e.g., a tuple with both values). In some embodiments, the time dependent features module 210 may create a set of feature vectors including only the observed values. The time dependent features module 210 may pass the feature vectors to the consolidation module 250 for further processing. The consolidation module 250 is discussed in greater details below.

The feature reduction module 220 may generate embedding features for the ensemble time series prediction model. In one embodiment, the feature reduction module 220 may process large and sparse datasets and performs dimensionality reduction. As referred herein, dimensionality reduction may refer to techniques that reduce the number of input variables in a dataset and generates embedding features that are high-level abstract representations extracted from the sparse dataset. The generated embedding features are more compact, which reduces time and storage space required and improves the performance of machines learning models. As an example, Electronic Health Records (EHR) may be one example of a large and sparse dataset that needs dimensionality reduction. The Electronic Health Records may include a combination of multiple types of clinical and health data, that include demographics, medical history, medication, allergies, immunization status, laboratory test results, radiology images, vital signs, personal statistics, etc. The Electronic Health Records may include a large number (e.g., thousands or even more) of data categories for each record. The dataset may be sparse, as a patient may only have data available to a limited number of data categories. The sparse dataset may result in inefficiency without any further processing. The feature reduction module 220 may perform any known embedding and dimensionality reduction algorithms for embedding the input data into feature embeddings, which are in a relatively low-dimensional space comparing to the original sparse dataset. In one embodiment, the features reduction module 220 may generate feature embeddings of fixed length, wherein the length is predetermined by a human such an expert in the field. The Electronic Health Record is one example of sparse datasets, and any sparse datasets that needs feature reduction may be processed by the feature reduction module 220. As another example, the features reduction module 220 may also embed Social Determinants of Health (SDoH) data into feature embeddings, where the SDoH may include information such safe housing, transportation, racism, education, income, access to nutritious foods, polluted air and water, language, literacy skills, etc. The features reduction module 220 may generate a set of feature embeddings from the input sparse dataset and pass the set of feature embeddings to the consolidation module 250 for further processing.

The continuous features module 230 may process and extract continuous features based on continuous datasets. A continuous dataset, as referred herein, may be a dataset with numerical values. A continuous dataset may be associated with a range, such as a lower bound and an upper bound. For example, a continuous dataset may include percentages (e.g., with a lower bound of 0% and an upper bound of 100%.) Referring back to the example for predicting genetic dispense rate, continuous features may be scaled wealth levels that indicate wealth levels associated with patients. In one embodiment the continuous features module 230 may generated a feature vector with the set of numerical values and pass the feature vector to the consolidation module 250 for further processing.

The time lagged features module 240 may extract feature vectors from data associated with time lags. The time lagged features module 240 may extract time lagged features from the time-lagged dataset and pass the time lagged features to the consolidation module 250. For example, claims data such as inpatient, outpatient, pharmacy and enrollment data may be time lagged data, because a clinic may not be aware of a claim until the claim is reported to the clinic. As used herein, the time period between when an event occurred and when the event is known to a party of interest may be referred to as a time lag. The time lagged features module 240 may process the time lagged data through a LSTM (long short-term memory) layer, which is a type of recurrent neural network capable of learning order dependence in sequence prediction problems. The time lagged features module 240 may extract time lagged features from the time lagged data by passing raw data (e.g., values and associated time lags) to the LSTM layer, which may output fixed length embeddings for different length of input data.

The consolidation module 250 may consolidate the outputs from modules 210-240 and generate a consolidated feature vectors for the subsequent neural networks. In some embodiments, the consolidation module may perform a concatenation of the results outputted from modules 210-240. In another embodiment the consolidation module may use other algorithms to consolidate the results such as weighted features if a particular feature should be weighed more heavily in the prediction process. The consolidation module 250 may pass the consolidated feature vectors to subsequent neural network layers for generating prediction results.

The neural network training module 260 may train a neural network that takes the consolidated feature vectors as input and generate prediction results with confidence intervals. The network training module 260 may include a recurrent unit and a regression unit, wherein the recurrent unit may explore sequential dependence of the input feature vectors, and the regression unit may perform regression algorithms and generate final predicted outputs. The neural network training module 260 may train the model through forward pass and backpropagation. Each layer in a neural network may include one or more nodes, which may be fully or partially connected to other nodes in adjacent layers. In a forward pass, the neural network performs the computation in the forward direction based on outputs of a preceding layer. The operation of a node may be defined by one or more functions. The functions that define the operation of a node may include various computation operations such as pooling, recurrent loop in a Recurrent Neural Network, various gates in LSTM, etc. The functions may also include an activation function that adjusts the weight of the output of the node. Nodes in different layers may be associated with different functions. Each of the functions in the neural network may be associated with different coefficients (e.g., weights and kernel coefficients) that are adjustable during training.

In some embodiments, the neural network training module 260 may associate some of the nodes in a neural network with an activation function that decides the weight of the output of the node in forward propagation. Common activation functions may include step functions, linear functions, sigmoid functions, hyperbolic tangent functions (tanh), and rectified linear unit functions (ReLU). In one embodiment, the neural network training module 260 may use the rectified linear activation function or ReLU as activation function. The rectified linear activation function (ReLU) is a piecewise linear function that will output the input directly if it is positive, otherwise, it will output zero. The ReLU function may help the model achieve better performance as ReLU help with producing stable gradients and therefore resolve the vanishing gradient problem as seen in many training processes. After an input is provided into the neural network and passes through a neural network in the forward direction, the results may be compared to the training labels or other values in the training set to determine the neural network's performance. The process of prediction may be repeated for other training data in the training sets to compute the value of the objective function in a particular training round. In turn, the neural network performs backpropagation by using gradient descent such as stochastic gradient descent (SGD) to adjust the coefficients in various functions to improve the value of the objective function.

The neural network training module 260 may perform multiple rounds of forward passes and backpropagation. The neural network training module 260 may determine that the training is complete when the objective function has become sufficiently stable (e.g., the model has converged) or after a predetermined number of rounds for a particular set of training samples. The trained model can be used for performing predictions. The recurrent unit and the regression unit are further discussed in accordance with FIG. 3 in an exemplary pipeline for the ensemble time series prediction system.

Figure 3:
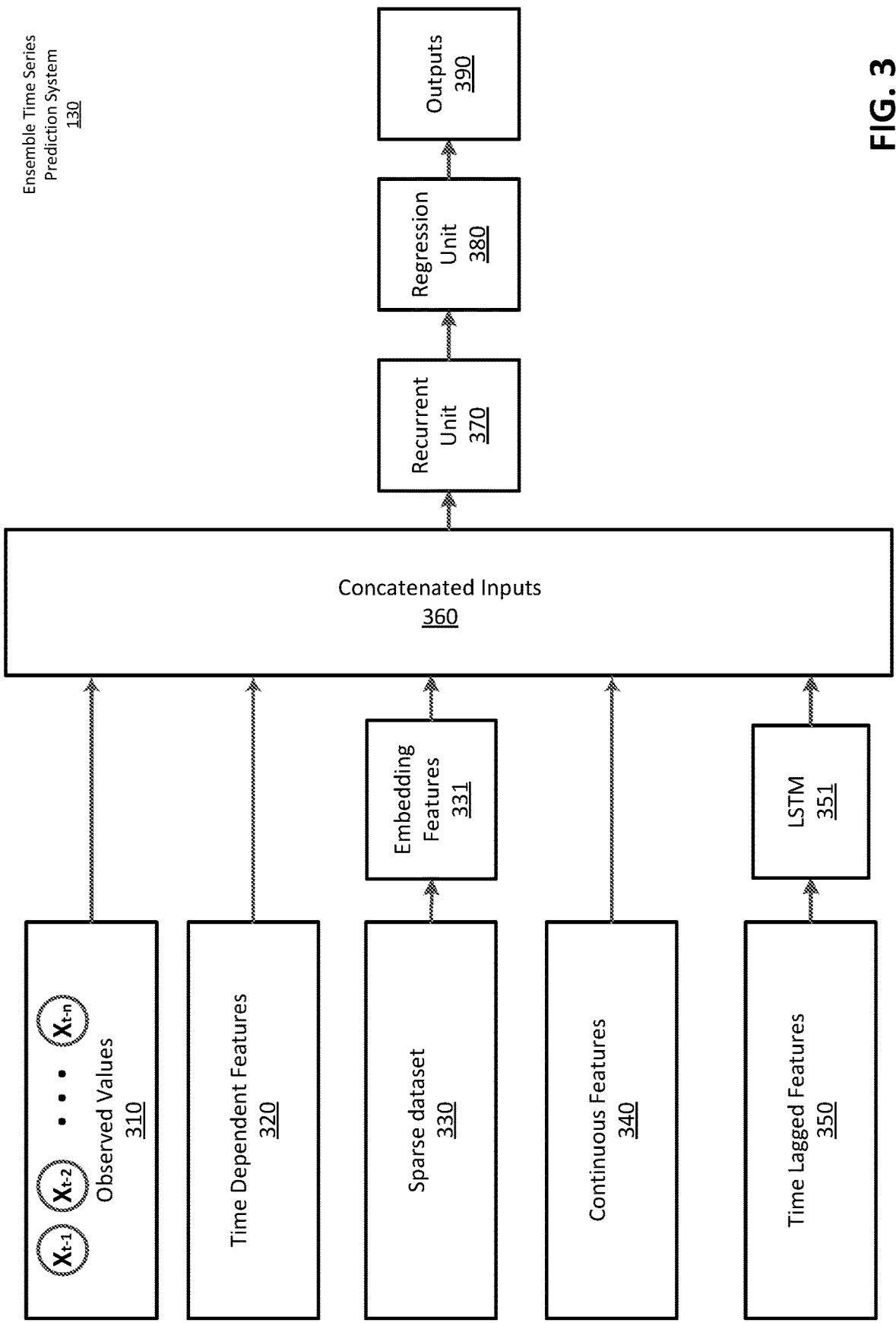
FIG. 3 illustrates an exemplary architecture of an ensemble time series prediction system, according to one embodiment.

FIG. 3 illustrates an exemplary architecture of an ensemble time series prediction system 130. The ensemble time series prediction system 130 may obtain and process data from different categories and generate different types of feature vectors, including but not limited to observed values 310, time dependent features 320, sparse dataset 330, continuous features 340, and time lagged features 350. Various types of datasets are processed by one or more of the modules described in FIG. 2, resulting in data features or datasets ready for concatenation. Datasets compromising different aspects of information helpful for the prediction are concatenated into the consolidated inputs 360, which may be the input for subsequent layers of the neural network model, such as the recurrent unit 370 and the regression unit 380.

Observed values 310 are historical values that may have sequential relationship with the value to be predicted. For example, if the goal is to predict an adherence rate for next March, the historical values may be observed adherence rates up to the latest data available. The ensemble time series prediction system 130 may concatenate the observed values 130 into the concatenated inputs 360. The time dependent features 320 are extracted from autoregressive time dependent data by the time dependent features module 210. The sparse dataset 330 (e.g., historical medical records) may be any large dataset with a high dimensionality and with a certain percentage (e.g., greater than 50%) of the values unknown or empty. The ensemble time series prediction system 130 may generate embedding features 331 using the feature reduction module 220 and pass the embedding features to the consolidation module 250. The ensemble time series prediction system 130 may further include continuous features 340 such as ages, scaled wealth levels, or percentages, and the consolidation module 250 may concatenate the continuous features as part of the concatenated inputs 360. The ensemble time series prediction system 130 may also use time lagged features 350 such as claims data and pass the time lagged features 350 through an LSTM 351, which may further extract order dependence information from the sequential data. The consolidation module 250 may concatenate results from 310-350 into concatenated inputs 360, which are passed to the recurrent unit 370.

In one embodiment, the recurrent unit 370 may be a recurrent neural network (e.g., Gated Recurrent Unit) that includes at least an input layer, a hidden layer and an output layer. The recurrent unit 370 may feed the outputs from the hidden layer back to the hidden layer until a predetermined number of iterations is reached, instead of passing through the layers in one direction as seen in a feedforward layer. Results outputted from the recurrent unit 370 are further passed to the regression unit 380, which may use Bayesian techniques (e.g., Bayesian Structural Model) and space state models for generating outputs 390 including the predictions and confidence intervals. In one embodiment, each prediction is associated with a confidence interval which is a range of values and a likelihood indicating how likely the predicted value falls within the confidence interval.

FIG. 4 illustrates an exemplary deployment process for an ensemble time series prediction system 130, according to one embodiment. The process 400 may start with the ensemble time series prediction system 130 receiving 402 a set of data comprising two or more datasets of different categories, such as observed historical dataset, autoregressive time dependent dataset, continuous dataset, high dimensional and sparse dataset, and time lagged dataset. The ensemble time series prediction system 130 may extract 404 a set of input features from each dataset of the two or more datasets. For example, the ensemble time series prediction system 130 may extract a set of feature vectors for each of the autoregressive time dependent dataset, continuous dataset, high dimensional and sparse dataset, and time lagged dataset. The consolidation module 250 may generate 406 a set of consolidated input features by concatenating the feature vectors generated based on the two or more datasets of different categories. The autoregressive time dependent dataset, continuous dataset, high dimensional and sparse dataset, and time lagged dataset may then generate 408 a set of prediction results, using trained parameters, a set of prediction results and a respective confidence interval for each prediction result of the set of prediction results. The ensemble time series prediction system 130 may output the set of prediction results and the respective confidence interval for each prediction result of the set of prediction results.

ADDITIONAL CONFIGURATION
CONSIDERATIONS

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for improving training data of a machine learning model through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined herein.

13

What is claimed is:

1. An ensemble model stored on a non-transitory computer readable storage medium, the model associated with a set of parameters, and configured to receive a set of features, wherein the model is manufactured by a process comprising:

obtaining a training dataset, wherein the training dataset is generated by concatenating two or more different datasets comprising historical observed values and time lagged features, wherein the time lagged features are extracted from a dataset including data with time lag information;

and forming, from the training dataset, a set of consolidated input feature vectors by concatenating features extracted from the two or more different datasets, wherein the set of consolidated input feature vectors comprises a concatenation of (i) the historical observed values (ii) continuous features (iii) fixed-length embeddings generated from high-dimension sparse datasets, and (iv) fixed-length embeddings of time-lag sequences;

for the ensemble model associated with the set of parameters, repeatedly iterating the steps of:

performing a forward pass by providing the set of consolidated input feature vectors as inputs to a neural network of the ensemble model to generate predicted outputs;

obtaining an error term from a loss function associated with the ensemble model;

backpropagating the error term to update the set of parameters associated with the ensemble model;

stopping the backpropagation after the error term satisfies a predetermined criterion; and storing the set of parameters on the computer readable storage medium as a set of trained parameters of the ensemble model and creating, using the stored set of parameters, a trained ensemble model configured to generate prediction results responsive to inputted consolidated feature vectors.

2. The ensemble model of claim 1, wherein the time lagged features are generated using a Long Short Term Memory (LSTM) neural network.

3. The ensemble model of claim 1, wherein the feature embeddings are of a first dimensionality and are generated based on input data that is of a second dimensionality, wherein the first dimensionality is smaller than the second dimensionality.

4. The ensemble model of claim 2, wherein the time dependent features are user parameters that change over time.

5. The ensemble model of claim 1, wherein the time-lagged data represents records storing information provided by a user.

6. The ensemble model of claim 1, wherein the ensemble model outputs predictions, wherein each prediction is associated with a confidence interval.

7. The ensemble model of claim 1, further comprising a recurrent unit that repeatedly passes outputs from one or more hidden layers of the recurrent unit back to the one or more hidden layers.

8. The ensemble model of claim 1, wherein the two or more different datasets are chosen from the following: an observed values dataset, an autoregressive time dependent dataset, a continuous dataset, a high-dimension dataset, and a time lagged dataset.

9. The ensemble model of claim 8, wherein the ensemble model generates a respective set of features for each of the autoregressive time dependent dataset, the continuous dataset, the sparse dataset, and the time lagged dataset.

10. The ensemble model of claim 1, wherein the historical observed values comprise observed medication adherence rate values aggregated by time period, and wherein the time-lagged features are extracted from claims data.

11. The ensemble model of claim 10, wherein the trained ensemble model is configured to generate a prediction of a medication adherence rate for a future time period.

12. The ensemble model of claim 1, wherein the ensemble model is configured to generate risk profile or risk prediction results for an entity, and wherein generating the training dataset comprises forming consolidated input feature vectors by concatenating features representing historical observed values associated with the risk profile and time-lag features derived from records that include time-lag information, including claims records.

13. The ensemble model of claim 1, wherein the historical observed values comprise generic dispense rate (GDR) values aggregated by time period for a population, and wherein the time-lagged features are extracted from claims data.

14. The ensemble model of claim 13, wherein the trained ensemble model is configured to generate a forecast of GDR for a future time period.

* * * * *